April 12, 1960

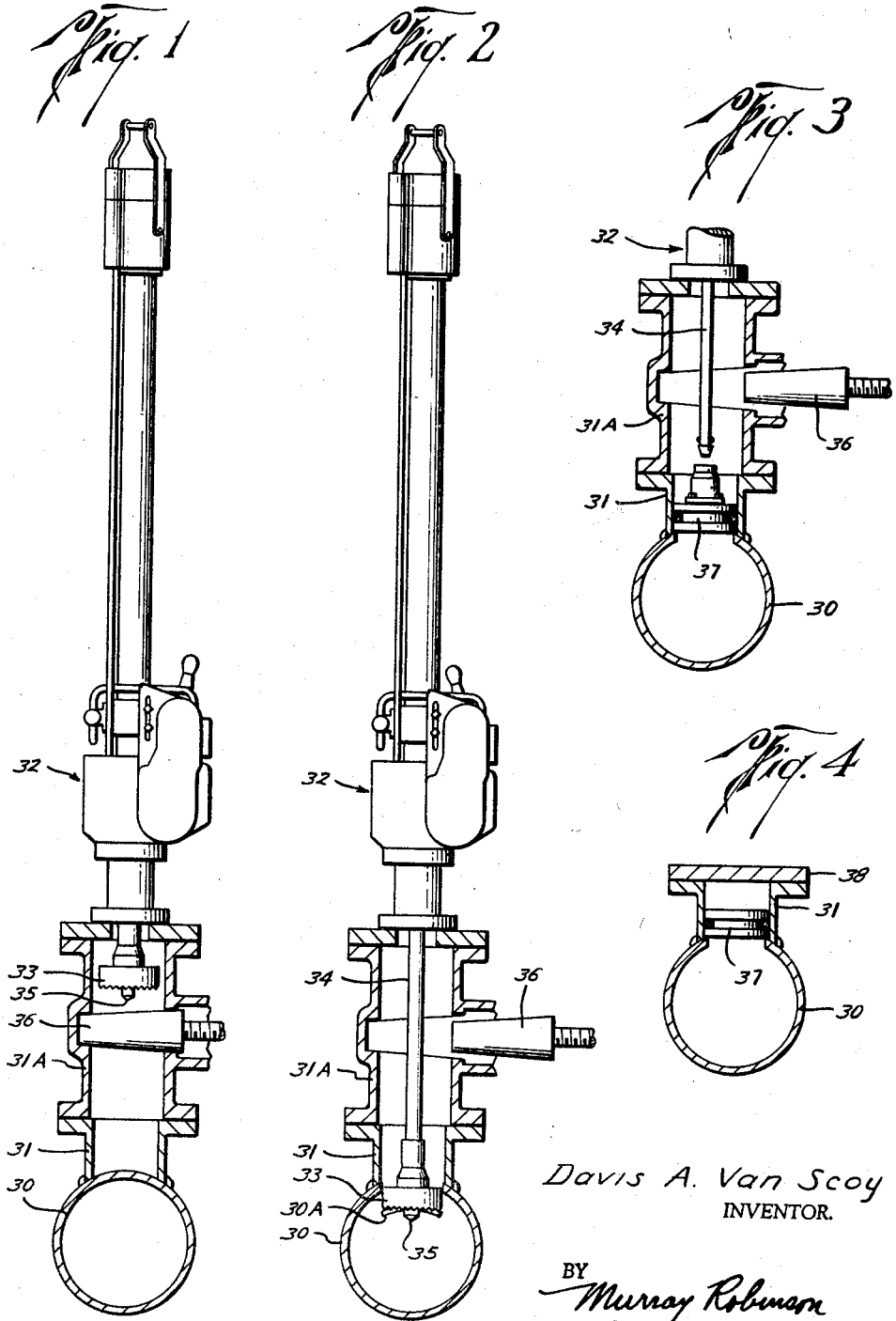

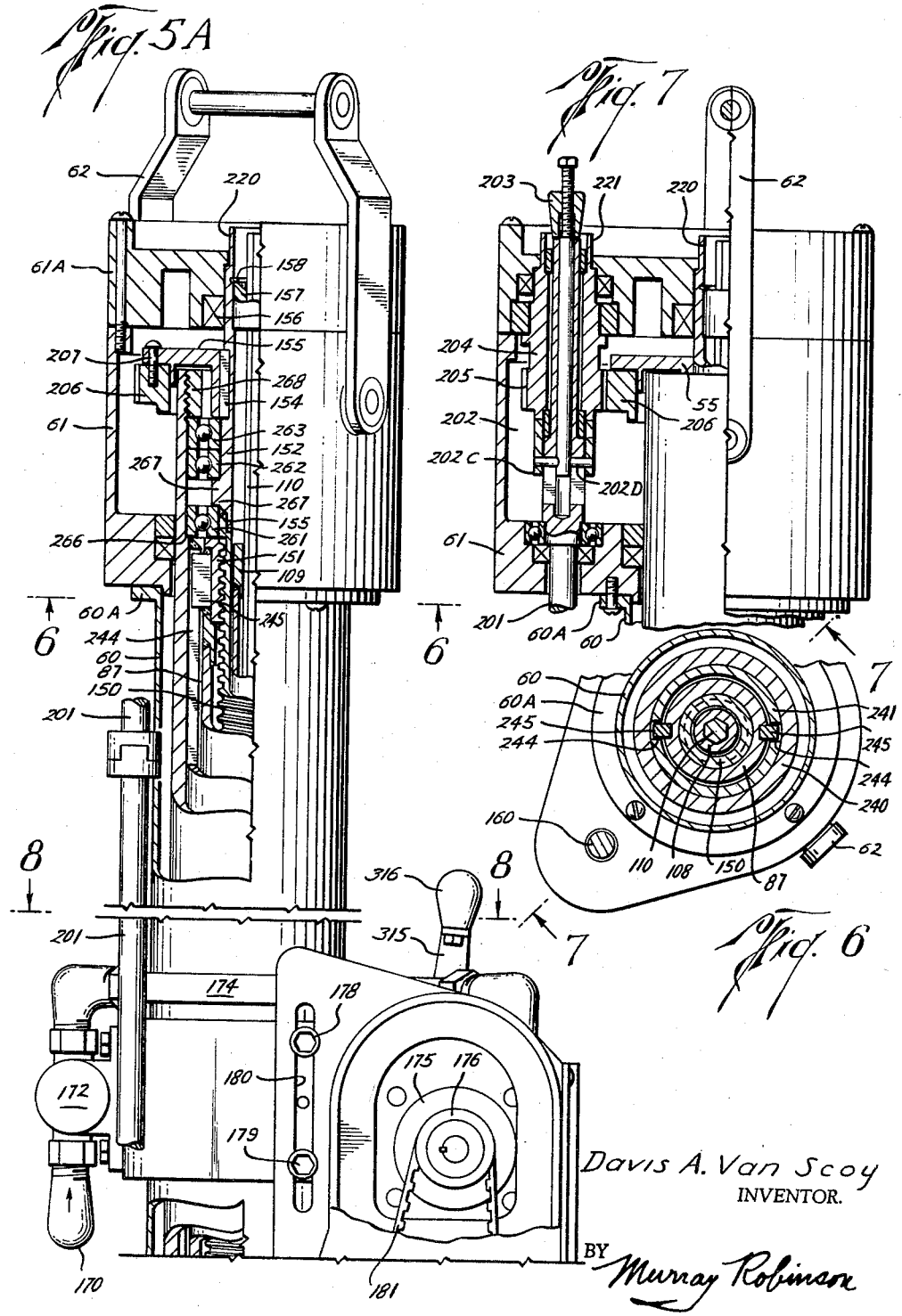

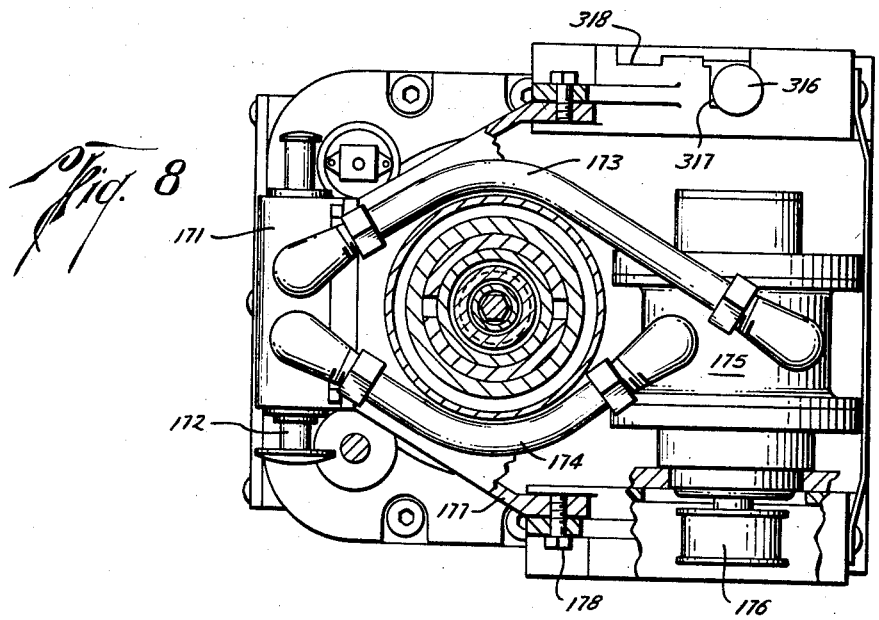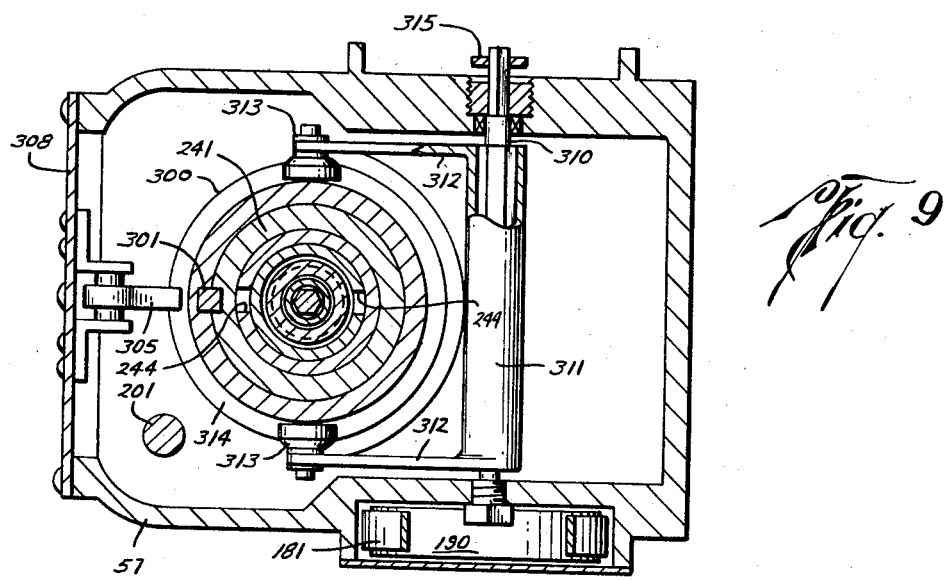

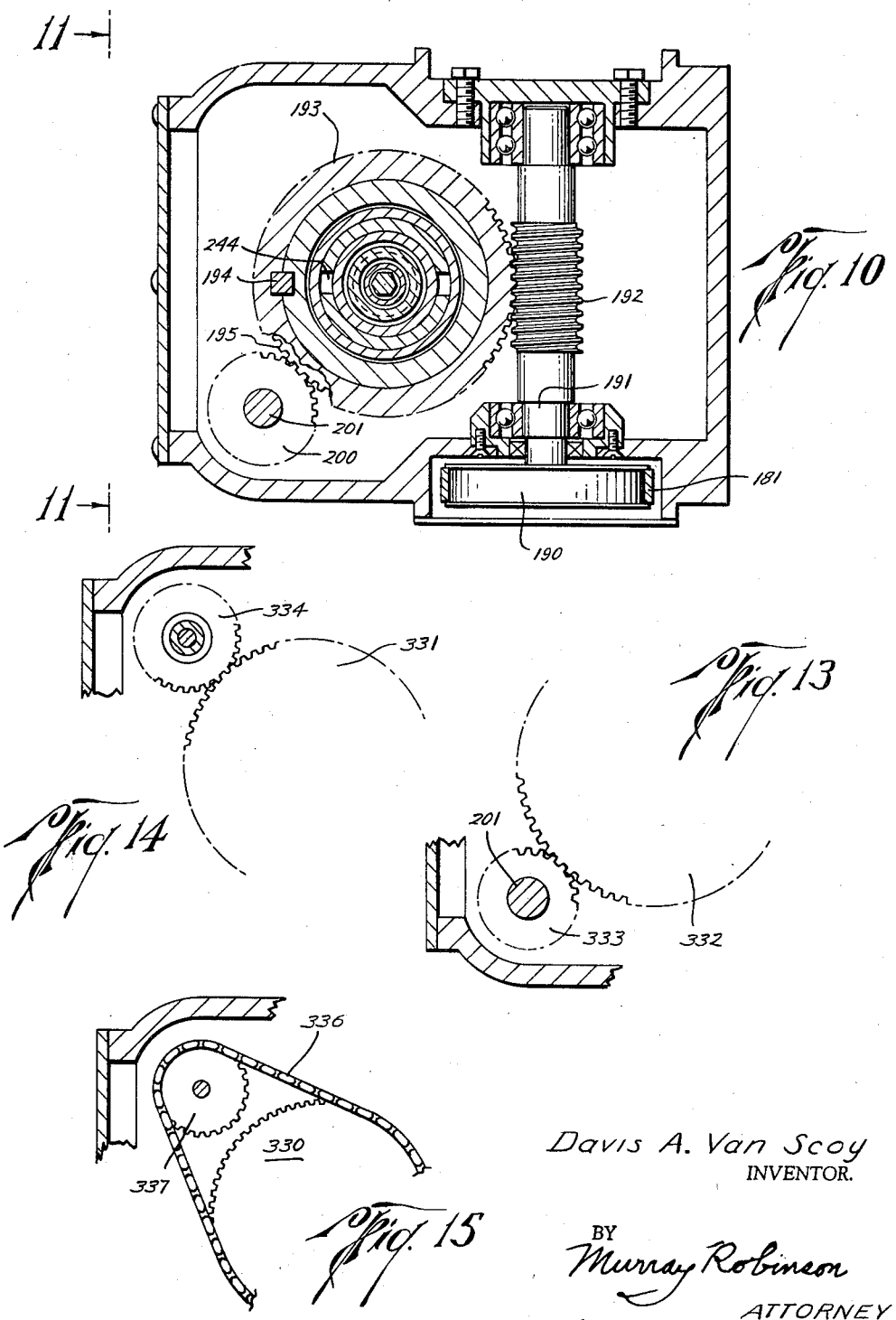

D. A. VAN SCOY 2,932,193

PIPE TAPPING APPARATUS

Filed Dec. 29, 1958

Davis A. Van Scoy
INVENTOR.

BY Murray Robinson
ATTORNEY

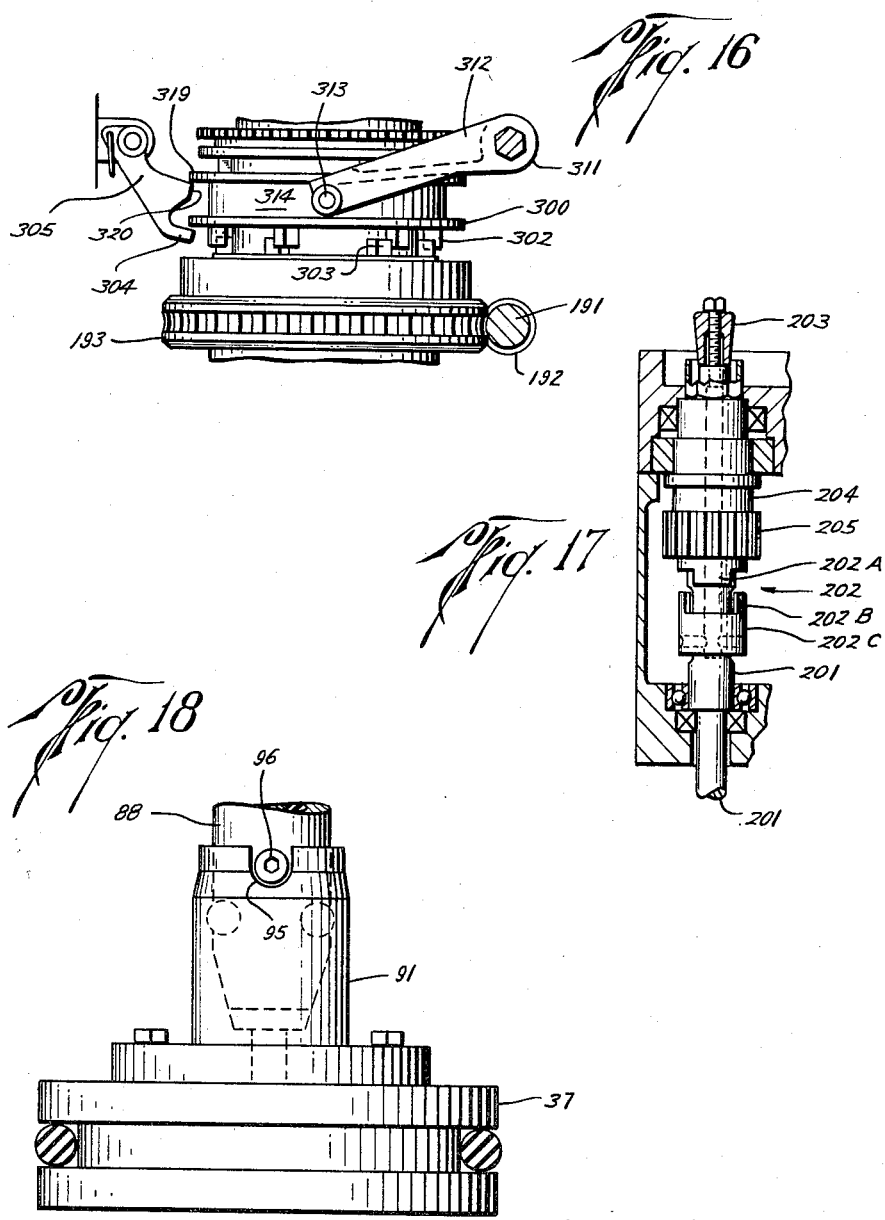

United States Patent Office 2,932,193
Patented Apr. 12, 1960

2,932,193
PIPE TAPPING APPARATUS

Davis A. Van Scoy, Houston, Tex., assignor to F. H. Maloney Company, Houston, Tex., a corporation of Texas Application December 29, 1958, Serial No. 783,347

12 Claims. (Cl. 77—42)

I. Introduction

This invention pertains to a pipe tapping machine.

Briefly, the invention comprises an elongated housing adapted to be connected at one end to a valve that has been secured to the pipe to be tapped, over the area where the hole is to be made. A tubular boring bar carrying a cutter on one end thereof is rotatably mounted in the housing and axially slidable therein so it can be projected out through the inner or valve end of the housing through the valve toward the pipe to be tapped. A drive tube is concentrically disposed around the boring bar and rotatably mounted inside the housing. A key on the outside of the boring bar near the other or outer end of the housing engages a slot in the drive tube so that the drive tube and boring bar rotate together. The drive tube is adapted to be rotated by means of an air motor carried by the housing near the inner end thereof and connectable to the drive tube through a speed reduction means and a first clutch.

The speed reduction means includes a worm wheel rotatably mounted on the drive tube near the inner end of the housing and the clutch is a jaw clutch including one set of annular disposed teeth connected to the worm wheel and another set connected to a clutch ring concentric with the drive tube and splined thereto and axially movable on the drive tube, this disposition of parts including the "floating" worm wheel of the invention.

A first ring gear affixed to the worm wheel drives a pinion which rotates a drive shaft extending the length of the housing. There is a pinion connected through a second clutch to the other end of the drive shaft near the outer end of the housing which drives a second ring gear disposed in the housing beyond the outer end of the drive tube, the second ring gear being secured to a feed screw tube that is concentrically disposed inside the tubular boring bar in engagement with a nut fixed inside the boring bar at the outer end thereof. This power transmission means provides a slight difference between the speed of rotation of the first and second ring gears due to the respective members of teeth on these gears and the pinions on the drive shaft, so that this means may be called a speed difference power transmission means.

When both clutches are engaged, the air motor causes the boring bar to rotate at a slightly lower angular velocity than the feed screw, causing the boring bar to move axially slowly relative to the feed screw at the same time the boring bar rotates. When the drive tube is disconnected from the air motor by means of the first clutch and held against rotation by a lock, the boring bar no longer rotates but moves axially at a higher velocity. This latter mode of operation is useful in advancing the boring bar rapidly toward the pipe and in retracting it therefrom. The former mode of operation is useful in cutting through the pipe with a cutter carried by the boring bar.

The tubular boring bar carries a cutter at its end retained thereon by means of balls that are disposed in holes in the boring bar and adapted to be moved out into engagement with means forming recesses in a socket on the cutter. An annular cam or wedge inside the tubular boring bar is movable axially to press the balls out into engagement with the cutter or to release same. The cam is carried on the end of an externally threaded cam shaft concentrically disposed inside the tubular boring bar and engaging a screw thread inside the tubular boring bar. The cam shaft has a tubular portion having an internal noncircular (hexagonal) cross section at one part thereof. A correlative (hexagonal) cross section rod extending through the housing at the opposite end from the cutter into the tubular part of the cam shaft serves to rotate the latter to actuate the cam. This mode of attaching the cutter is another important feature of the invention.

A rotation counter connected both to the drive tube and the feed screw through a differential serves to indicate the axial progress of the boring bar, whether driven at slow or fast speed. This is another feature of the invention.

Other features of the invention and the advantages thereof will become apparent from the following description of a preferred embodiment thereof, reference being had to the accompanying drawings wherein:

Figures 1 and 2 are elevations of an apparatus according to the invention showing same assembled to a valve mounted on a pipe to be tapped, the valve and pipe being shown in section, Figure 1 showing an initial stage in the operation of the apparatus and Figure 2 showing a later stage;

Figure 3 is a view similar to the lower portions of Figures 1 and 2 showing a still later stage in operation;

Figure 4 is a sectional view of the pipe as in Figures 1–3 showing the completed operation;

Figure 5B:
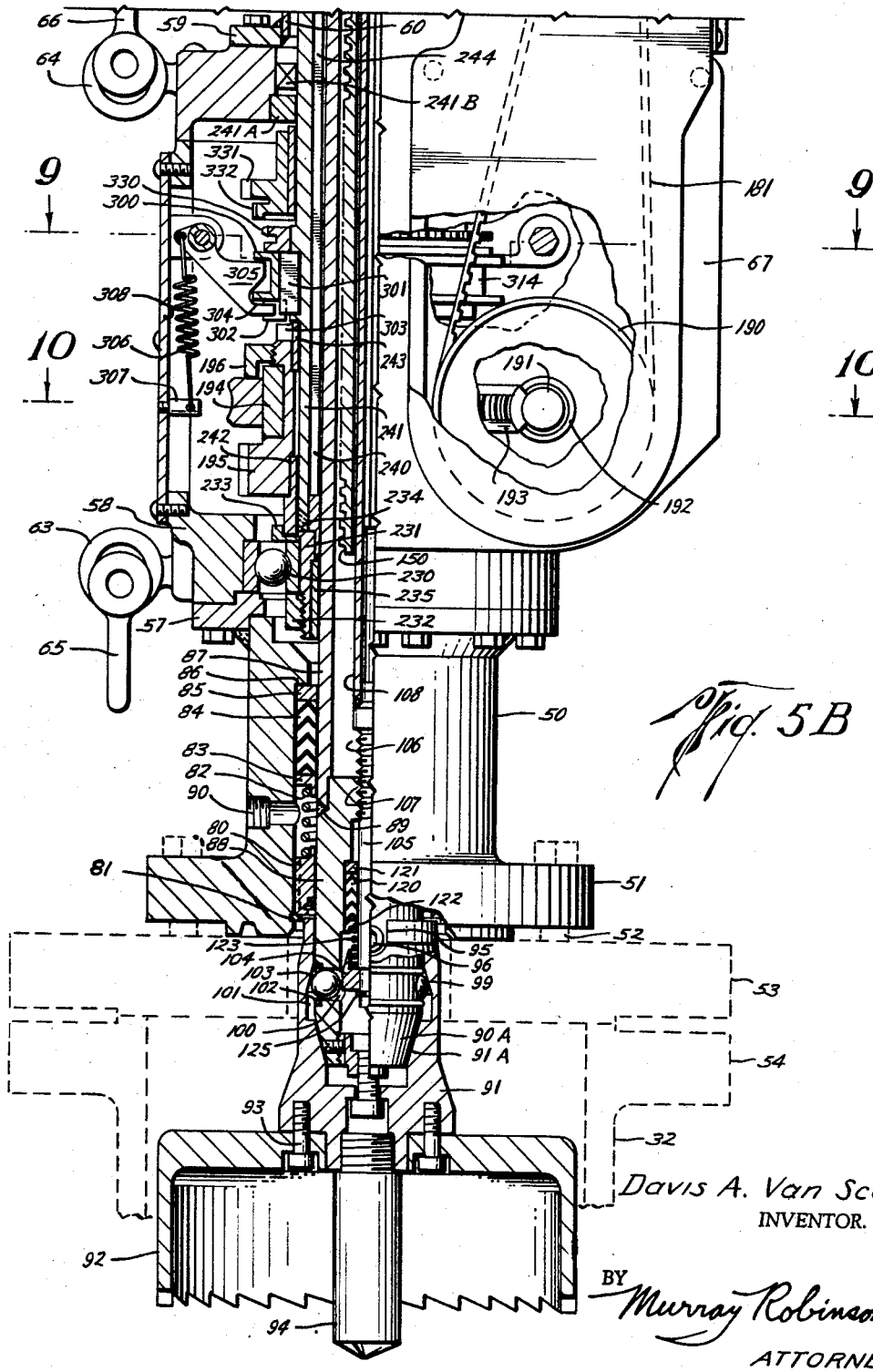
Figures 11, 12:
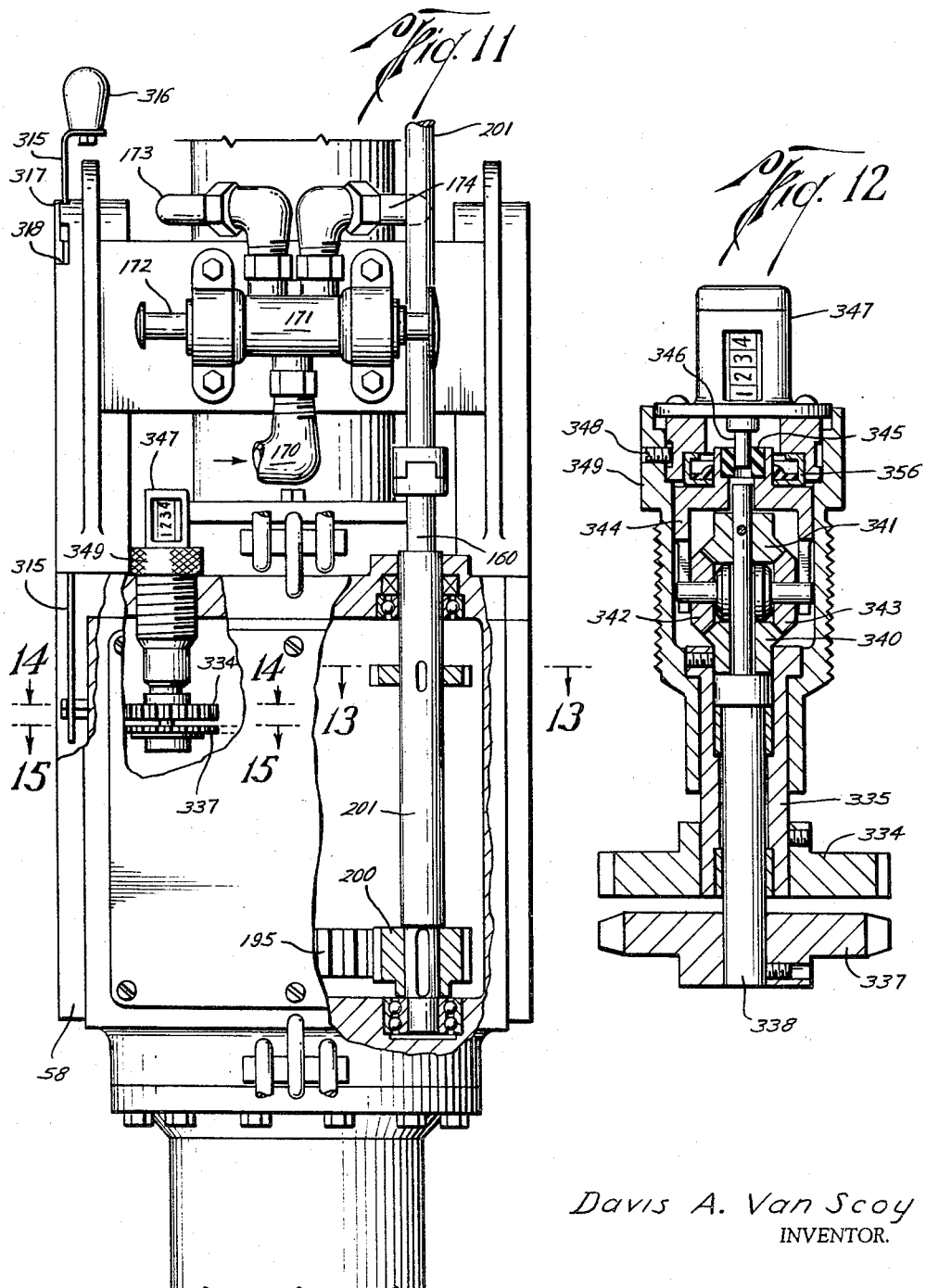

Figures 5A and 5B together show the pipe tapping apparatus of Figures 1 and 2 to a larger scale with portions broken away and in section;

Figure 6 is a section taken in line 6—6 of Figure 5A;

Figure 7 is an elevation of the upper part of the apparatus of Figure 5A, partly in section on line 7—7 of Figure 6;

Figures 8, 9 and 10 are transverse sections taken on the lines 8—8, 9—9, and 10—10 of Figures 5A and 5B;

Figure 11 is a fragmentary elevation looking at the left side of Figures 5A and 5B, the housing being partly broken away to show the interior and portions of the interior being omitted for clarity.

Figure 12 is a sectional detail showing the revolutions counter, partly in elevation and partly in axial section;

Figures 13, 14 and 15 are transverse sections taken at lines 13—13, 14—14, and 15—15 of Figure 11;

Figures 16 and 17 are detail elevations showing the first and second clutches, respectively; and Figure 18 is an elevation showing a plug substituted for the cutter on the end of the boring bar, for the operation shown (in a later stage) in Figure 3.

II. General operation

Referring now to Figures 1–4, there is shown a pipe 30 in various stages of the tapping operation, a flanged nipple 31 is welded to the pipe over the area where the hole is to be made. A full opening gate valve 31A is flange connected to the nipple 31. Pipe tapping apparatus 32 is flange connected to the valve 31. Figure 1 shows the cutter 33 of the pipe tapping apparatus above the gate valve, which valve is closed. After the valve is opened, the boring bar 34 is moved axially until pilot bit 35 engages the pipe, following which the cutter 33 engages the pipe and cuts a disc shaped segment or "coupon" 30A therefrom, as shown in Figure 2, suitable means not shown being employed to retain the coupon upon the pilot bit 35 rather than allowing it to fall into the pipe. The boring bar is then retracted above the gate 36 of the valve and the valve closed again as in Figure 1, following which the pipe tapping apparatus can be removed. The cutter 33 and bit 35 are then replaced with a seal plug 37 which is lowered into the nipple 31 with the boring bar after the pipe tapping apparatus has been reassembled on the valve. The seal plug 37 is released from the boring bar and the latter retracted. Suitable means, not shown, are employed to hold the plug in position in the nipple. The pipe tapping apparatus and valve are then removed and a cover plate 38 secured to the flanged nipple over the plug 37, as shown in Figure 4. Whenever it is desired to make a connection to the pipe at this point, a valve may be substituted for the plate 38 and the seal plug 37 removed with the pipe tapping apparatus or with other apparatus.

III. *Housing*

Referring now to Figures 5A and 5B the pipe tapping apparatus 32 comprises a housing including spool 50 having a lower flange 51 adapted to be connected by bolts 52 to adapter flange 53 connected to the top flange 54 of valve 32. The housing further comprises a flange 57 welded to the upper end of the spool and secured by screws to a gear case 58. A plate 59 is secured by screws to the upper end of the gear case and is welded to an outer tube 60 forming the upper part of the housing. The housing further includes a gear box 61 fastened to a flange 60A at the upper end of outer tube 60. A cover plate 61A fastened by screws to the upper end of the gear box completes the housing. A bail 62, also shown in Figure 7, is pivotally connected to the upper end of the housing for facilitating handling of the apparatus. The housing is also provided with eyes 63, 64 screwed into the gear case and clevises 65, 66 pined thereto for further facilitating handling of the apparatus. The housing is provided with an enlargement 67 at one side to accommodate an air motor and portions of the speed reduction means.

IV. *Boring bar and cutter holder*

Within the lower end of the housing spool 50 is disposed a bronze bearing 80 held in place by a snap ring 81 and a helical spring 82, the latter pressing upwardly against packing follower ring 83. Above ring 83 is chevron packing 84 which bears against upper bearing ring 85, which rests against a shoulder 86 inside spool 50. Rotatably mounted in bearing 80 and bearing ring 85 is the tubular portion 87 of boring bar 34. The lower end of the boring bar includes a tubular pin 88 welded to the lower end of the boring bar tube at 89. Packing 84 seals between the housing and the boring bar tube. A port 90 in the housing spool 50 is normally closed by a screw plug (not shown). The port 90 provides an opening. The outside of the bronze bearing 80 is fluted so that pressure inside the body of the valve to which the apparatus is connected in use can pass into the inner part of the housing spool 50. When it is desired to relieve the pressure in the valve body after the tapping operation has been completed and the valve closed, such pressure can be bled off through port 90 in the housing spool 50. The port 90 is adapted for connection to a pipe nipple leading to a control valve (not shown) whereby the flow passage from the port 90 can be opened and closed as desired. The port 90, and the pipe nipple and contact valve, also provide means through which grease can be admitted for lubricating and sealing the bearings supporting the boring bar.

The pin 88 is tapered at its lower end 90A to fit within the correlatively tapered socket 91A of a cutter holder 91. Cutter holder 91 carries a crown cutter 92 removably connected thereto by screws 93 whereby it can be readily replaced by another crown cutter when it becomes a drill or when a different size is required, or when it is desired to substitute a plug such as 37, as shown in Figures 3, 4 and 18. A pilot bit 94 is screwed into the center of holder 91 so that it too can be readily replaced when desired. The upper part of the holder socket has recesses 95 formed therein to receive drive pins 96 secured to and extending radially from the pin 88 of the tubular boring bar, by which means the cutter holder is rotated by the boring bar.

The cutter holder is retained on the boring bar pin against axial removal by balls 99 extending from holes 100 in the pin 88 into annular recess 101 in the holder. Snap rings 102 prevent the balls from falling out when the pin is out of the holder socket. The upper portions 103 of recess 101 are tapered to press the balls inwardly under the force of the weight of the cutter holder to release the holder when desired. The balls are held out against the pressure of the tapered surface 103 by annular cam 104 carried by cam shaft 105. Cam shaft 105 is externally threaded at 106 to engage threads 107 on the interior of the boring bar pin 87. The cam shaft includes a tubular portion 108 in the upper end of which is secured a head (Fig. 5A) 109 whose inner cross section is hexagonal for reception of hexagonal actuator rod 110 extending thereinto from the upper end of the apparatus through a hole in cover 61. By turning actuator rod 110 the cam shaft moves axially to cause the cam 104 to free or press outwardly the balls 99 so as to release or lock in position the cutter holder 91 or boring bar pin 88.

The cam shaft is sealed to the pin 88 by chevron packing 120 disposed between base ring 121 and follower ring 122, the packing being compressed by helical spring 123 which bears at its lower end against cam 104, the latter being retained on the cam shaft by snap ring 125.

V. *Feed screw*

In the annulus between the boring bar tube and the cam shaft is disposed a feed screw tube 150. The feed screw engages a nut 151 carried by the upper end of the boring bar tube 87. The upper end of the feed screw tube comprises an unthreaded bearing and key support piece 152 welded to the threaded part of the feed screw tube at 153. Support piece 152 is connected by key 154 to flanged drive collar 155. The outer end of piece 152 rests in bearing 156 in cover plate 61A. A bearing 157 secured inside piece 152 by snap ring 158 provides support for the outer end of actuator 110.

VI. *Drive motor*

As previously stated in the introduction, the feed screw and boring bar are driven by an air or by hydraulic or other fluid motor through a speed reduction means, a speed difference power transmission means, and two clutches. Referring now particularly to Figures 5A, 8, and 11, air for the motor enters through pipe elbow 170, passes through control valve 171, and thence, depending on the position of valve actuator 172, through one of the pipes 173, 174, to air motor 175. The motor is preferably of the rotary vane type. A pulley 176 is provided on the end of the motor shaft. The motor and associated piping and valve are carried by brackets 177. The bracket is held by screws 178, 179 passing through a slot 180 in a plate 180A secured to the gear case and forming a part of the housing of the pipe tapping apparatus. By means of this mounting the position of the motor may be adjusted relative to the rest of the apparatus, e.g., to adjust belt tension.

VII. *Speed reduction means*

There is a belt 181 that passes around pulley 176. Referring now particularly to Figures 5B and 10, belt 181 drives a pulley 190 secured on shaft 191. There is a worm 192 secured to shaft 191 which drives worm wheel 193. Worm wheel 193 is secured by key 194 to gear 195, being retained against axial displacement by nut 196.

VIII. Speed difference power transmission means

Referring now to Figure 10, gear 195 drives pinion 200 secured to drive shaft 201. As seen in Figures 11 and 5A, and 7 shaft 201 extends out of the gear case 58 along the outside of the housing into the gear box 61. Clutch 202 controlled by operator 203 releasably connects shaft 201 to shaft 204 on which pinion 205 is formed. As best shown in Figure 17, clutch 202 includes jaw teeth 202A on the shaft 204 and teeth 202B on a ring 202C slidably mounted on shaft 201 and connected for rotation therewith by pin 202D secured to actuator 203.

Pinion 205 drives gear 206 (see also Figure 5A) which is connected by screws 207 to drive flange 155. By this means the feed screw is rotated by the air motor, and with the boring bar tube held against rotation, by means subsequently to be described, it will be driven axially by the feed screw. If it is desired to move the boring bar axially by hand, the clutch 202 is disconnected and the boring bar tube can be rotated on the stationary feed screw by applying a crank to the hexagonal head 220 on the outer end of support piece 152 (Figure 5A) on the outer end of the feed screw tube. If a slight mechanical advantage is desired, the crank can be applied to the hexagonal head 221 on the outer end of shaft 204.

A bearing 230 is disposed in the lower end of the gear case to support the lower end piece 231 of a drive tube that extends coaxially in between the housing and boring bar tube. A threaded ring 232 screwed onto end piece 231 of the drive tube engages the underside of bearing 230 and a thrust ring 233 disposed beneath flange 234 of the end piece 231 engages the upper side of bearing 230. A bearing sleeve 235 inside end piece 231 engages the outside of the boring bar tube 87. This provides additional support for both the boring bar tube and and the drive tube.

The end piece 231 of the drive tube is welded to inner tube 240 and outer tube 241 of the drive tube. The outer tube is provided with sleeve bearings 242, 243 for rotatably mounting the gear 195 thereon. Tubes 240, 241 pass out of the gear case 57 through a bearing 241A. A seal 241B between the gear case opening and the outer tube 241 enables the gear case to be kept full of lubricant.

As best seen in Figures 5A and 6, the inner tube 240 of the drive tube is provided with keyways 244 throughout its length. These engage keys 245 secured to the upper end of boring bar tube 87. By this means the boring bar tube is coupled to the drive tube for rotation therewith while allowing relative axial motion thereof.

Ball bearings 261, 262, 263 are disposed inside the upper end of outer tube 241 of the drive tube, bearing 261 being held between shoulder 266 on the outer tube 241 and flange 267 on support piece 152 of the feed screw tube. Bearings 262, 263 are held between flange 267 and threaded ring 268 screwed into outer tube 241. This provides axial and radial support for the drive tube and feed screw.

IX. Main clutch

Referring to Figure 5B, a clutch ring 300 is splined to the outer tube 241 of the boring bar by a key 301. When the clutch ring is moved inwardly, jaw teeth 302 on the clutch ring engage clutch teeth 303 mounted on the outer end of ring gear 195, whereby the drive tube is connected to the air motor. The clutch ring is locked against rotation when in disengaged position by finger 304 on one arm of a bell crank 305, the other arm of the bell crank being connected to a tension spring 306 secured to pin 307 screwed into the gear case cover 308. Finger 304 engages between jaw teeth 302 to hold the clutch ring against rotation. This in turn locks the drive tube and boring bar against rotation.

As best shown in Figure 9, the clutch is movable from disengaged to engaged position and vice versa, by an actuating means. The actuating means comprises a shaft 310 rotatably mounted in gear case 57. A sleeve 311 secured to the shaft 310 has a pair of arms 312, which carry pins 313 at the ends thereof. The pins 313 engage annular groove 314 (see also Figure 16) in the outer periphery of the clutch ring 300. To one end of shaft 310, outside the gear case 57, there is secured a lever 315. As shown in Figure 11 there is a handle 316 secured to the end of lever 315. The lever is engageable with notches 317, 318 on the side of the gear case (see also Figure 8) to hold it in positions corresponding to clutch engaged and disengaged positions respectively. The lever 315 is flexible enough to allow it to be moved sideways to clear the portion of the gear case between notches 317, 318.

As shown in Figure 16, when the main clutch is moved to engaged position the outer wall 319 of groove 314 of the clutch ring pushes against finger 320 on the bell crank arm and turns the bell crank. The lock finger 304 is thus moved out of its position between the teeth 302, thereby freeing the clutch for rotation. The locking finger 304 constitutes the brake for the boring bar referred to in the introduction.

The main clutch just described is the first clutch referred to in the introduction. When this clutch is engaged, as well as the second or auxiliary clutch 202, the air motor causes both the boring bar and feed screw to rotate, but at slightly different speeds, whereby the boring bar is moved slowly axially inwards toward the pipe to be tapped, or, if the air valve 171 is reversed, outwards away from the pipe.

X. The feed indicator

Referring to Figure 5B, a gear 330 is secured to the drive tube and a double gear 331, 332 is rotatably mounted on the drive tube. Gear 332 (see Figure 13) is connected by pinion 333 to drive shaft 201 (see also Figure 11). The teeth ratio of gears 332, 333 is the same as that of gears 206, 205, so that gear 331 rotates at the same speed as the feed screw. As shown in Figure 14, gear 331 is engaged with pinion 334 secured to shaft 335 (see Figure 12). Gear 330 on the drive tube is connected by chain 336 (see Figure 15) to pinion 337. Pinion 337 is secured to shaft 338 (see Figure 12). Due to the use of a chain drive for pinion 337 and a direct drive for pinion 334, their directions of rotation are opposite.

Referring to Figure 12, shaft 335 drives bevel gear 340 and shaft 338 drives bevel gear 341. The bevel gears drive planetary gears 342, 343 carried by cage 344. Shafts 335 and 338 drive bevel gears 340, 341 in opposite directions so that cage 344 rotates at the difference between the speeds of shafts 335 and 338 and hence at a speed proportional to the rate of axial advance of the boring bar. This is true whether the main clutch is engaged or disengaged for slow or fast advance of the boring bar, and whether the air motor is driven forwards or in reverse. Only in case the auxiliary clutch is disconnected is the cage 344 disconnected from the feed screw so as no longer truly to indicate the axial movement of the boring bar, and in such case the revolutions of the feed screw are easily counted as the hand crank is turned.

The cage 344 is connected by rubber sleeve 345 to shaft 346 of a revolutions counter 347 which indicates the axial movement of the boring bar. The revolutions counter 347 is secured by set screw 348 in the end of a screw plug 349. The screw plug is screwed into the outer end of the gear case 58, as shown in Figure 11. Referring again to Figure 17, the revolutions counter is sealed to cage 344 by seal ring 350 to retain the oil in the gear case. The screw plug 349 provides a bearing at its inner end for shaft 355, and shaft 355 is hollow providing a bearing for shaft 338 concentrically disposed therein.

XI. Conclusion

It is believed that the operation of the apparatus will be apparent from the foregoing description. By way of recapitulation it may be noted that the one apparatus is suitable both for tapping a pipe and later plugging it if it is not desired to flow through the new tap at once. The apparatus is also useful for removing the plug. The change from tapping to plugging is accomplished by changing the cutter for a plug which is easily accomplished with the cam actuated retention means for the cutter or plug holder.

The differential drive for the revolutions counter enables the counter to be simultaneously connected to both the feed screw and boring bar regardless of the position of the main clutch so that it indicates axial progress of the boring bar both during the initial fast feed when the feed screw alone is rotating and during slow feed when both boring bar and feed screw are rotating.

The free floating worm wheel of the speed reduction means enables the speed reduction and motor to be placed by the designer wherever desired for proper balance of the machine, e.g., the center of gravity can be placed close to the inner or flange end of the apparatus to facilitate lowering it into a hole.

The drive shaft enables a portion of the speed difference power transmission to be placed at the outer or bail end of the housing so that two different speeds or gear ratios are available for manual feed.

The placement of the main clutch between the speed reduction means and the drive tube and the placement of the speed difference power transmission between the speed reduction means and feed screw enable a single speed reduction means to be used both for simultaneous power drive of bar and feed screw during tapping of a pipe and for power drive of the feed screw alone when moving the boring bar rapidly to and from the pipe preparatory to and subsequent to tapping.

While a preferred embodiment of the invention has been shown and described, many modifications thereof can be made by one skilled in the art without departing from the spirit of the invention and it is desired to protect by Letters Patent all forms of the invention falling within the scope of the following claims.

I claim:

1. Pipe tapping apparatus comprising an elongated housing having an inner end and an outer end, means to connect said inner end of the housing to a pipe, a tubular boring bar rotatably and axially slidably mounted in said housing and protruding through said inner end, a drive tube rotatably mounted inside the housing and concentrically disposed outside the boring bar and extending from near the inner end of the housing to near the outer end of the housing, a key on the outside of the boring bar near the outer end thereof engaging a slot inside the drive tube, said slot extending from near the outer end of the drive tube to near the inner end thereof, a worm wheel concentrically disposed around said drive tube, bearing means mounting said worm wheel on and for rotation relative to said drive tube, main clutch means including a clutch ring, spline means connecting said clutch ring to said drive tube for rotation therewith while allowing relative axial movement thereof, said main clutch means further including inter-engageable parts connected to said clutch ring and worm wheel to rotate said clutch ring with said worm wheel when said main clutch means is engaged, a worm in driving engagement with said worm wheel, reversible motor means connected to said worm, a first ring gear concentrically disposed around said drive tube and connected to said worm gear for rotation therewith, a drive shaft extending parallel to said drive tube from near the inner end of said housing to near the outer end thereof, a first pinion on said drive shaft engaging said first ring gear, a second pinion, auxiliary clutch means for connecting said second pinion to said drive shaft, a second ring gear concentric with said drive tube and engaged with said second pinion, a tubular feed screw concentrically disposed inside said drive tube and connected at its outer end to said second ring gear, the gear ratio of said first pinion and first ring gear being slightly different from the gear ratio of said second pinion and second ring gear to cause said feed screw to be rotated at a slightly different speed from said boring bar when both said main and auxiliary clutches are engaged, a third pinion affixed on said drive shaft between said first and second pinions and nearer said inner end of the housing, a third ring gear concentrically disposed on said drive tube and rotatable relative thereto, said third ring gear engaging said third pinion, the gear ratio of said third pinion and third ring gear being the same as that of said second pinion and second ring gear to cause the third ring gear to rotate at the same speed as said feed screw when said auxiliary clutch is engaged, a fourth ring gear concentric with and affixed to said third ring gear, a fourth pinion connected to said fourth ring gear, a fifth ring gear concentric with and affixed to said drive tube, a fifth pinion, a chain connecting said fifth pinion to said fifth ring gear, a differential, said fourth and fifth pinions being connected to the sun gears of said differential, and a revolutions counter connected to the cage of said differential that carries the planetary gears thereof, said boring bar having a pin on the protruding end thereof, a tool holder having a socket receiving said pin, there being an annular recess around the inner periphery of said socket, the wall at the outer end of said recess flaring inwardly, said pin being hollow and having a plurality of holes through its side wall, a ball in each of said holes extending out into said recess, an annular cam inside said pin holding said balls pushed out into said recess when the high point of the cam is opposite said balls and allowing said flaring wall of said holder socket to push said balls inwardly out of said recess when the low point of the cam is opposite said balls, a cam shaft connected to said cam and extending axially inside said boring bar and feed screw toward the outer end of the housing inter-engaging threads on the outside of said cam shaft and the inside of said boring bar near the inner end thereof, said threads providing means for causing the cam to be moved axially when the cam shaft is rotated, a cam actuator extending through said feed screw from the outer end of the housing to said cam shaft, means connecting the ends of said cam shaft and actuator to cause the cam shaft to rotate when the actuator is rotated but allowing the actuator to remain axially stationary as the cam shaft moves axially.

2. Pipe tapping apparatus comprising an elongated housing having an inner end and an outer end, means to connect the inner end of the housing to a pipe, a tubular boring bar rotatably and axially slidably mounted in said housing and protruding through said inner end, a drive tube rotatably mounted inside the housing and concentrically disposed outside the boring bar, and extending from near the inner end of the housing to near the outer end of the housing, a key on the outside of the boring bar near the outer end thereof engaging a slot inside the drive tube, said slot extending from near the outer end of the drive tube to near the inner end thereof, a worm wheel concentrically disposed around said drive tube, bearing means mounting said worm wheel on and for rotation relative to said drive tube, main clutch means including a clutch ring, spline means connecting said clutch ring to said drive tube for rotation therewith while allowing relative axial movement thereof, said main clutch means further including interengageable parts connected to said clutch ring and worm wheel to rotate said clutch ring with said worm wheel when said main clutch means is engaged, a worm in driving engagement with said worm wheel, and reversible motor means connected to said worm.

3. Pipe tapping apparatus comprising an elongated housing having an inner end and an outer end, means to connect said inner end of the housing to a pipe, a tubular boring bar rotatably and axially slidably mounted in said housing and protruding through said inner end, a drive tube rotatably mounted inside the housing and concentrically disposed outside the boring bar and extending from near the inner end of the housing to near the outer end of the housing, a key on the outside of the boring bar near the outer end thereof engaging a slot inside the drive tube, said slot extending from near the outer end of the drive tube to near the inner end thereof, a worm wheel concentrically disposed around said drive tube, bearing means mounting said worm wheel on and for rotation relative to said drive tube, main clutch means including a clutch ring, spline means connecting said clutch ring to said drive tube for rotation therewith while allowing relative axial movement thereof, said main clutch means further including inter-engageable parts connected to said clutch ring and worm wheel to rotate said clutch ring with said worm wheel when said main clutch means is engaged, a worm in driving engagement with said worm wheel, reversible motor means connected to said worm, a first ring gear concentrically disposed around said drive tube and connected to said worm wheel for rotation therewith, a drive shaft extending parallel to said drive tube from near the inner end of said housing to near the outer end thereof, a first pinion on said drive shaft engaging said first ring gear, a second pinion, an auxiliary clutch means for connecting said second pinion to said drive shaft, a second ring gear concentric with said drive tube and engaged with said second pinion, a feed screw concentrically disposed inside said drive tube and connected at its outer end to said second ring gear, the gear ratio of said first pinion and first ring gear being slightly different from the gear ratio of said second pinion and second ring gear to cause said feed screw to be rotated at a slightly different speed from said boring bar when both said main and auxiliary clutches are engaged, and a nut inside said boring bar near the outer end thereof, said nut being affixed to said boring bar and engaged with said feed screw passing axially therethrough.

4. Pipe tapping apparatus comprising an elongated housing having an inner end and an outer end, means to connect said inner end of the housing to a pipe, a tubular boring bar rotatably and axially slidably mounted in said housing and protruding through said inner end, a drive tube rotatably mounted inside the housing and concentrically disposed outside the boring bar and extending from near the inner end of the housing to near the outer end of the housing, a key on the outside of the boring bar near the outer end thereof engaging a slot inside the drive tube, said slot extending from near the outer end of the drive tube to near the inner end thereof, a worm wheel concentrically disposed around said drive tube, bearing means mounting said worm wheel on and for rotation relative to said drive tube, main clutch means including a clutch ring, spline means connecting said clutch ring to said drive tube for rotation therewith while allowing relative axial movement thereof, said main clutch means further including inter-engageable parts connected to said clutch ring and worm wheel to rotate said clutch ring with said worm wheel when said main clutch means is engaged, a worm in driving engagement with said worm wheel, reversible motor means connected to said worm, a first ring gear concentrically disposed around said drive tube and connected to said worm gear for rotation therewith, a drive shaft extending parallel to said drive tube from near the inner end of said housing to near the outer end thereof, a first pinion on said drive shaft engaging said first ring gear, a second pinion, an auxiliary clutch means for connecting said second pinion to said drive shaft, a second ring gear concentric with said drive tube and engaged with said second pinion, a feed screw concentrically disposed inside said drive tube and connected at its outer end to said second ring gear, the gear ratio of said first pinion and first ring gear being slightly different from the gear ratio of said second pinion and second ring gear to cause said feed screw to be rotated at a slightly different speed from said boring bar when both said main and auxiliary clutches are engaged, and a nut inside said boring bar near the outer end thereof, said nut being affixed to said boring bar and engaged with said feed screw passing axially therethrough, a third pinion affixed on said drive shaft between said first and second pinions and nearer said inner end of the housing, a third ring gear concentrically disposed on said drive tube and rotatable relative thereto, said third ring gear engaging said third pinion, the gear ratio of said third pinion and third ring gear being the same as that of said second pinion and second ring gear to cause the third ring gear to rotate at the same speed as said feed screw when said auxiliary clutch is engaged, a fourth ring gear concentric with and affixed to said third ring gear, a fourth pinion connected to said fourth ring gear, a fifth ring gear concentric with and affixed to said main clutch ring, a fifth pinion, a chain connecting said fifth pinion to said fifth ring gear, a differential, said fourth and fifth pinions being connected to the sun gears of said differential and a revolutions counter connected to the cage of said differential that carries the planetary gears thereof.

5. Pipe tapping apparatus comprising an elongated housing having an inner end and an outer end, means to connect said inner end of the housing to a pipe, a tubular boring bar rotatably and axially slidably mounted in said housing and protruding through said inner end, said boring bar having a pin on the protruding end thereof, a tool holder having a socket receiving said pin, there being an annular recess around the inner periphery of said socket, the wall at the outer end of said recess flaring inwardly, said pin being hollow and having a plurality of holes through its side wall, a ball in each of said holes extending out into said recess, an annular cam inside said pin holding said balls pushed out into said recess when the high point of the cam is opposite said balls and allowing said flaring wall of said holder socket to push said balls inwardly out of said recess when the low point of the cam is opposite said balls, a cam shaft connected to said cam and extending axially inside said boring bar toward the outer end of the housing, inter-engaging threads on the inside of said boring bar and outside of said cam shaft providing means for causing the cam to be moved axially when the cam shaft is rotated, a cam actuator extending through said boring bar from the outer end of the housing to said cam shaft means connecting the ends of said cam shaft and actuator to cause the cam shaft to rotate when the actuator is rotated but allowing the actuator to remain axially stationary as the cam shaft moves axially.

6. Pipe tapping apparatus as defined by claim 2 and including a feed screw concentrically disposed inside said boring bar, and power transmission means for rotating said feed screw.

7. Pipe tapping apparatus as defined by claim 6 wherein said power transmission means includes a drive shaft extending parallel to said drive tube from near the inner end of said housing to near the outer end thereof, gear means to transfer rotational power from said worm wheel to the inner end of said drive shaft, second gear means to transfer rotational power from the outer end of said drive shaft to the outer end of said feed screw, and an auxiliary clutch between said drive shaft and said second gear means.

8. Pipe tapping apparatus as defined by claim 7 wherein the gear ratio in said first gear means is different from the gear ratio in said second gear means, and wherein said boring bar has internal threads engaged with said feed screw passing axially therethrough.

9. Pipe tapping apparatus comprising an elongated housing having an inner end and an outer end, means to connect the inner end of the housing to a pipe, a tubular boring bar rotatably and axially slidably mounted in said housing and protruding through said inner end, a drive tube rotatably mounted inside the housing and concentrically disposed outside the boring bar, and extending from near the inner end of the housing to near the outer end of the housing, means engaging said drive tube and said boring bar for rotation together but allowing longitudinal movement of said boring bar relative to said drive tube, a driven gear concentrically disposed around and rotatable with respect to said drive tube, main clutch means adapted to connect said driven gear to said drive tube for rotation together, a driving gear in driving engagement with said driven gear, and a motor connected to said driving gear.

10. Pipe tapping apparatus as defined by claim 9 wherein said motor is a reversible motor.

11. Pipe tapping means as defined by claim 10 and including a feed screw concentrically disposed inside said boring bar, a drive shaft extending parallel to said drive tube from near the inner end of said housing to near the outer end thereof, gear means to transfer rotational power from said driven gear to the inner end of said drive shaft, second gear means to transfer rotational power from the outer end of said drive shaft to the outer end of said feed screw, and an auxiliary clutch between said drive shaft and said second gear means.

12. Pipe tapping apparatus as defined by claim 11 wherein the gear ratio in said first gear means is different from the gear ratio in said second gear means, and wherein said boring bar has internal threads engaged with said feed screw passing axially therethrough.

References Cited in the file of this patent

UNITED STATES PATENTS 2,838,964     Albertson et al. _____ June 17, 1958